Sept. 27, 1932.  W. H. ROBERTSON  1,880,025
INTERNAL COMBUSTION ENGINE
Original Filed Dec. 13, 1919  4 Sheets-Sheet 1

Inventor
William H. Robertson,
By Frederick J. Hardman
Attorney

Sept. 27, 1932.   W. H. ROBERTSON   1,880,025
INTERNAL COMBUSTION ENGINE
Original Filed Dec. 13, 1919   4 Sheets-Sheet 2
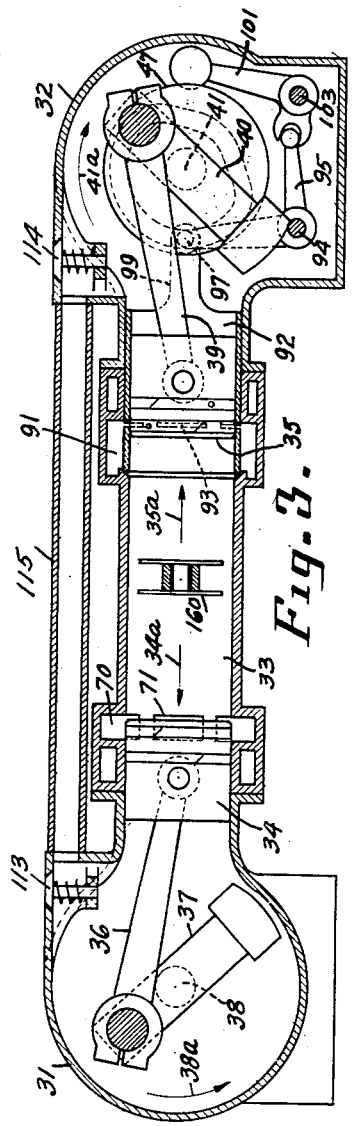
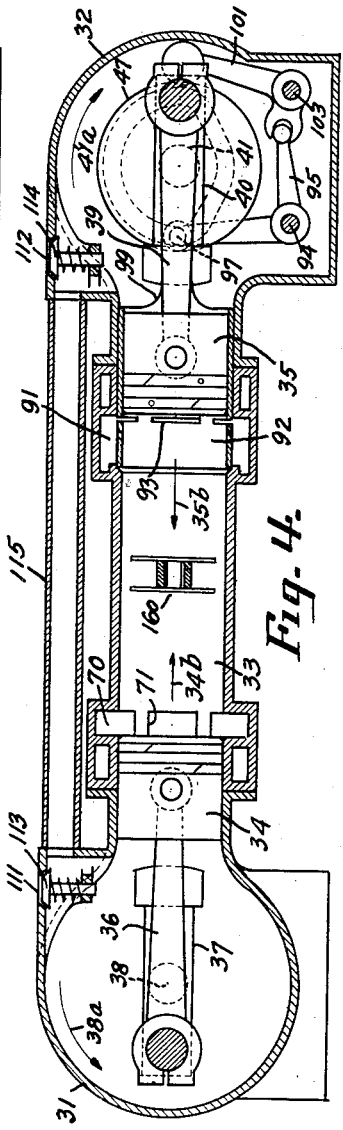
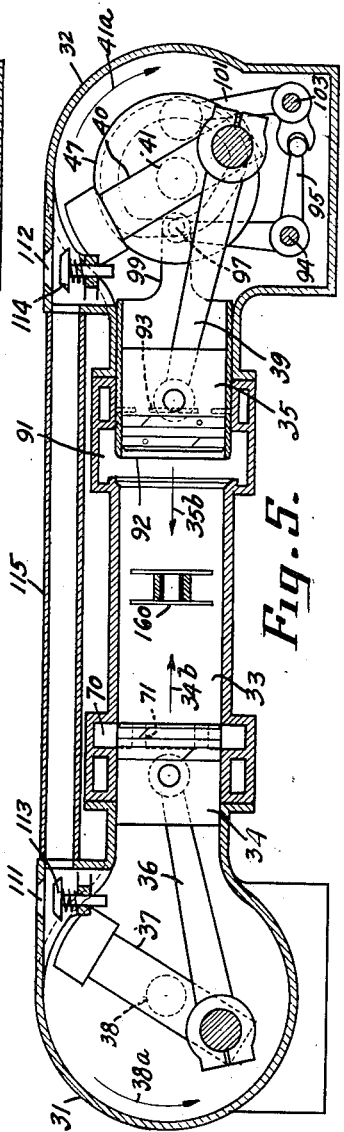
Inventor
William H. Robertson
By Frederick J. Hardman
Attorney Sept. 27, 1932.    W. H. ROBERTSON    1,880,025
INTERNAL COMBUSTION ENGINE
Original Filed Dec. 13, 1919    4 Sheets-Sheet 3

Inventor
William H. Robertson
By Frederick J. Hardman
Attorney

Sept. 27, 1932.  W. H. ROBERTSON  1,880,025
INTERNAL COMBUSTION ENGINE
Original Filed Dec. 13, 1919   4 Sheets-Sheet 4

Inventor
William H. Robertson
By Frederick J. Hardman
Attorney

Patented Sept. 27, 1932

1,880,025

UNITED STATES PATENT OFFICE

WILLIAM H. ROBERTSON, OF DAYTON, OHIO

INTERNAL COMBUSTION ENGINE

Substitute application filed December 13, 1919, Serial No. 344,715. Renewed April 5, 1929.

This invention relates to internal combustion engines, and more especially to two cycle engines of the Diesel type.

One aim of the invention is to provide an engine having the highest possible thermal efficiency, and, in carrying out this aim, novel means are provided for securing an intimate mixture of the air for supporting combustion and the fuel separately injected into the cylinder; novel means are provided for scavenging the engine in the most effective manner; and novel means are provided for utilizing the energy of the exhaust gas.

I aim to secure high thermal efficiency by providing that the air used to support combustion shall be initially compressed by the operation of the engine and that it shall be caused to swirl through the engine cylinder in order more thoroughly to mix with the injected fuel. The air which enters the cylinder after the explosion has taken place is likewise caused to rotate as it passes through the cylinder so that, by its swirling action, this air will effectively scavenge the cylinder.

In order to utilize the energy of the exhaust gas, I provide that the exhaust shall pass through a turbine, preferably of the DeLaval type, before passing into the atmosphere.

Another object of the invention is to secure as perfect a dynamic balance as possible. One manner of accomplishing this result is to provide two oppositely reciprocating pistons in the cylinder, said pistons cooperating with oppositely revolving crank shafts which operate to oppositely revolving flywheels. By making the moving parts of equal weight, the vibration which one set of parts would tend to set up is offset by the equal and opposite effect of the other set of parts which operates contrariwise.

A further object is to reduce to a minimum the weight of the engine per horsepower. This object is accomplished in one manner by utilizing flywheels of comparatively small mass and gearing them up to the engine crank shafts so that the flywheel elements, by their increased speed, will be effective to produce a steady flow of power from the engine.

In this connection it is a further object that the moving element of the engine operated air compressor shall act as one flywheel element, and that the turbine rotor shall act as the other flywheel element, thereby reducing the number of parts as well as the weight per horsepower.

Another object of the invention is to provide novel means for injecting fuel into the engine in such a manner as to be thoroughly mixed with the combustion air to insure a uniform fuel mixture.

A further object is to provide a valveless fuel pump for injecting fuel into the engine.

A further object is to provide for the control of the engine speed by controlling the operation of the pump by the engine. One manner of accomplishing this object is to control the amount of fuel forced into the engine cylinder during each cycle of the engine operation.

A further object is to eliminate noise by providing a muffler of improved construction which will relieve the exhaust of a large portion of its energy while permitting a rapid escape into the outside atmosphere. In carrying out this object I provide that the exhaust turbine shall act also as the muffler. In accomplishing this object, the number of engine parts and the weight per horsepower are reduced.

Other and further objects and advantages of the present invention will be apparent from the following description of a preferred embodiment thereof, reference being made to the accompanying drawings.

In the drawings:—

Fig. 3, Fig. 4 and Fig. 5 are sectional views taken on line 3—3 of Fig. 2 showing the engine parts in their relative positions during different stages of the engine cycle;

Figure 2:
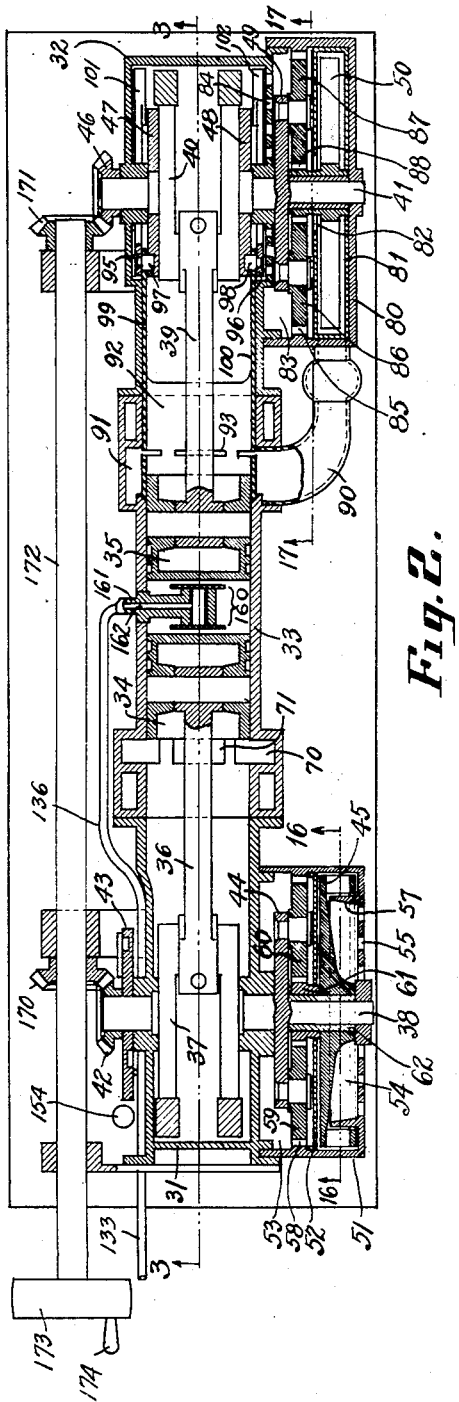
Fig. 2 is a sectional view taken on line 2—2 of Fig. 1.
Figure 1:
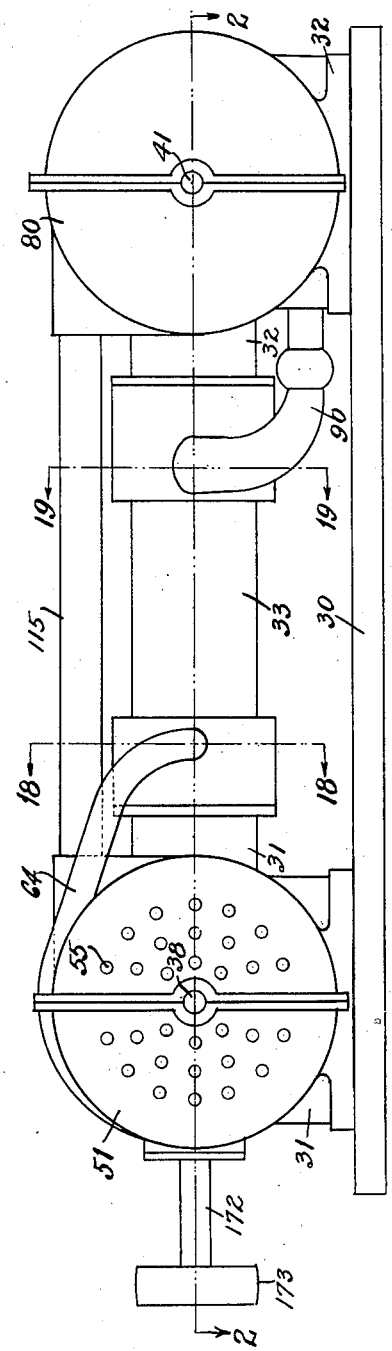
Fig. 1 is a side elevation of an engine embodying the present invention.

Referring to the drawings, a base 30 supports crank cases 31 and 32, which support between them a cylinder 33 in which slide pistons 34 and 35. Piston 34 is connected by rod 36 with crank 37 formed preferably integrally with crank shaft 38. Piston 35 is connected by rod 39 with crank 40 also formed integrally with crank shaft 41.

Shaft 38 directly drives gear 42, fuel-pump cam 43, and planetary gear arm 44; while turbine rotor 45 is mounted to rotate thereupon.

Shaft 41 directly drives gear 46, slide valve cams 47, 48, and planetary gear arm 49, while fan rotor 50 is mounted to rotate thereupon.

Figure 16:
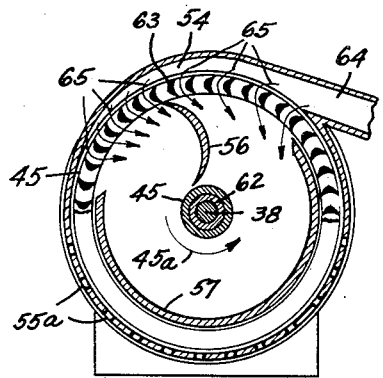
Fig. 16 is a sectional view taken on line 16—16 of Fig. 2.

A turbine housing 51 mounted upon crank case 31 is divided by a partition 52 into a turbine gear case 53 and a turbine rotor case 54. The end wall of housing 51 is provided with apertures 55 and with inwardly projecting ledges 56 and 57, see Fig. 16; and the cylindrical wall of housing 51 is provided with internal gear 58, which meshes with planetary gears 59 and 60, rotatably mounted on gear arm 44. Housing 51 is provided with holes 55a see Fig. 16. Gears 59 and 60 mesh with pinion 61 attached to bearing sleeve 62 which supports turbine rotor 45 which rotates normally in the direction of arrow 45a.

Rotor 45 is provided with blades 63 arranged to be impinged upon by the exhaust gases which enter through exhaust pipe 64 and circulate through the rotor 45 and into rotor case 54 as indicated approximately by arrows 65. The ledge 56 divides the spent gases into two streams which tend to meet against the ledge 57, this ledge 57 serving to divert the spent gases out through holes 55. Any part of the exhaust carried around by the rotor blades may escape through openings 55a.

Exhaust pipe 64 is connected with annular exhaust passage 70 of cylinder 33, and passage 70 is connected with cylinder 33 through exhaust ports 71.

Figure 17:
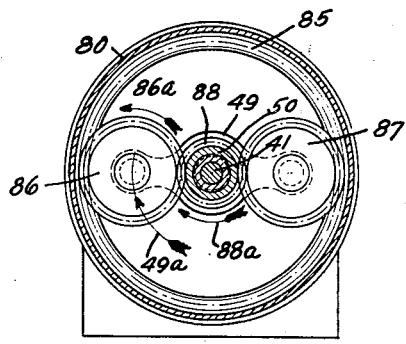
Fig. 17 is a sectional view taken on line 17—17 of Fig. 2.

A fan housing 80 is provided with a fan rotor case 81 provided with a central aperture 82 communicating with fan gear case 83, which in turn is connected with the interior of crank case 32 through holes 84. Housing 80 is provided with an internal gear 85, see Fig. 2 and Fig. 17, which meshes with planetary gears 86 and 87, rotatably mounted upon gear arm 49. Gears 86 and 87 mesh with pinion 88 which is directly connected with fan rotor 50. The normal direction of rotation of the gearing is indicated in Fig. 17 by arrows 49a, 86a and 88a.

Figure 19:
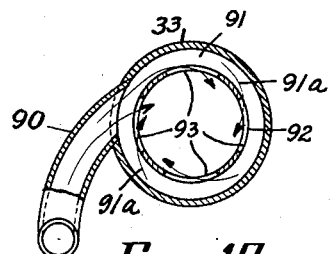
Fig. 19 is a sectional view taken on line 19—19 of Fig. 1.
Figure 20:
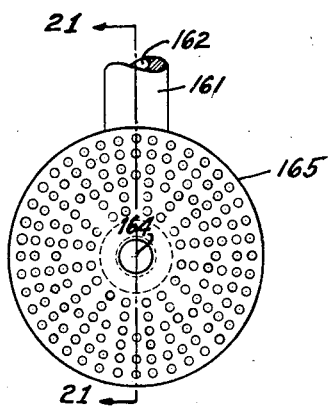
Fig. 20 is an end elevation of the fuel nozzle.
Figure 21:
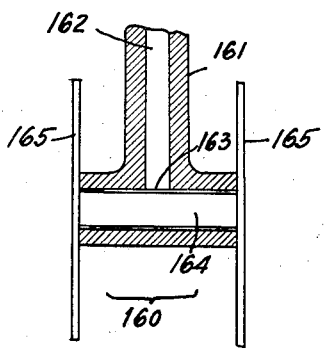
Fig. 21 is a sectional view taken on line 21—21 of Fig. 20.

Fan casing 81 is connected by air intake pipe 90 with annular intake chamber 91, see Figs. 2 and 19. Communication between chamber 91 and cylinder 33 is controlled by slide valve 92, provided with ports 93.

Crank case 32 supports a rod 94, see Fig. 3 which supports bell crank levers 95, 96 carrying cam rollers 97, 98 respectively, cooperating with races provided in cams 47, 48, respectively. Rollers 97, 98 are connected with arms 99, 100 respectively of the valve 92. Levers 95, 96 cooperate with counterbalance levers 101, 102, respectively, mounted upon rod 103 carried by crank case 32.

Crank cases 31 and 32 are provided with air inlet ports 111 and 112, respectively, closed by spring pressed valves 113 and 114, respectively, which are arranged to be opened by suction within the crank cases during the compression stroke of the pistons. Crank cases 31 and 32 are connected by pipe 115.

Figure 6:
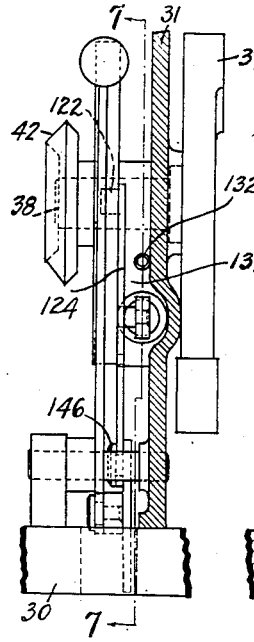
Fig. 6 is a left end elevation of the fuel pump and operating mechanism.
Figure 7:
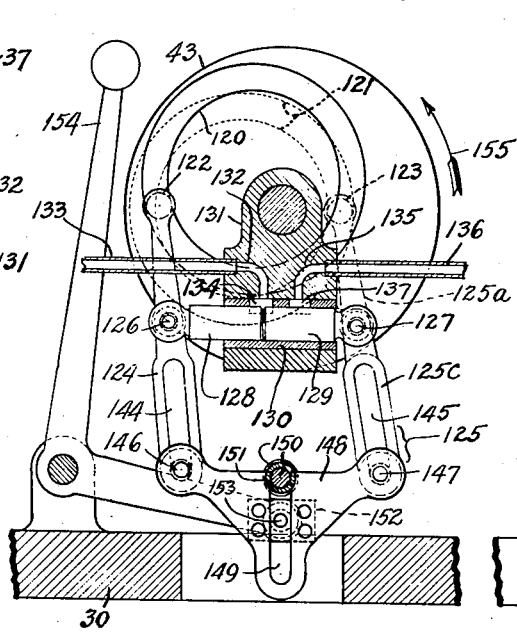
Fig. 7 is a sectional view taken on line 7—7 of Fig. 6.
Figure 8:
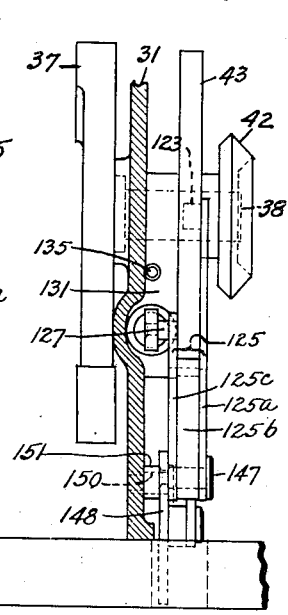
Fig. 8 is a right end elevation of the fuel pump.

Referring to Figs. 6 to 8 inclusive, the fuel pump will next be described. Pump cam 43 is provided with races 120 and 121, cooperating with rollers 122 and 123, respectively, carried by levers 124 and 125, respectively. Levers 124 and 125 are connected by studs 126 and 127, respectively, with plungers 128 and 129, respectively, which slide within sleeve 130 mounted in pump frame 131 formed preferably integrally with a side wall of crank case 31.

Frame 131 is provided with fuel inlet passage 132 connected with inlet pipe 133 which leads from a fuel tank, not shown. Passage 132 leads into inlet port 134 provided in sleeve 130. Frame 131 is provided with fuel outlet passage 135 connected with fuel outlet pipe 136 which leads to the fuel nozzle to be described. Passage 135 leads out from outlet port 137 provided in sleeve 130.

Levers 124 and 125 are provided with slots 144 and 145, respectively, through which pass studs 146 and 147, respectively, carried by fulcrum plate 148. Plate 148 is provided with a slot 149 through which projects a stud 150 mounted upon a wall of crank case 31. A spacing washer 151 is located between crank case 31 and plate 148 to maintain plate 148 in proper alignment.

As lever 125 must cooperate with elements located on opposite sides of cam 43, said lever 125 is composed of section 125a carrying the cam roller 123, section 125c attached to plunger 129, and an intermediate connecting section 25b.

Plate 148 carries a block 152 to which is attached by means of stud 153 a bell-crank lever 154 which is rotatably supported upon the base 30.

Figure 9:
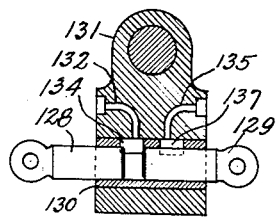
Fig. 9, Fig. 10 and Fig. 11 are sectional views of certain parts shown in Fig. 7, showing stages of operation of the pump when set to deliver a relatively large amount of fuel per engine cycle.
Figure 10:
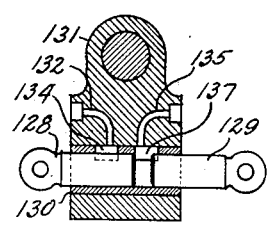
Figure 11:
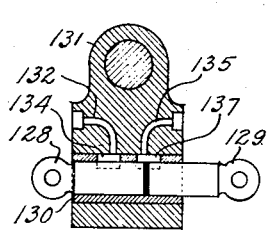
Figure 12:
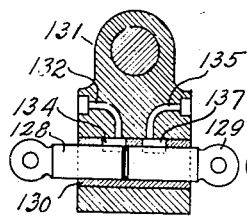
Fig. 12, Fig. 13, Fig. 14 and Fig. 15 are sectional views similar to those shown in Fig. 7, Fig. 9, Fig. 10 and Fig. 11 showing stages of pump operation when the pump is set to deliver a relatively small quantity of fuel per engine cycle.
Figure 13:
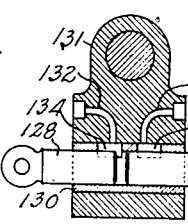
Figure 14:
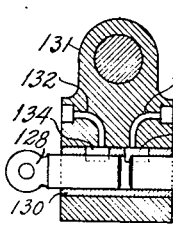

The cycle of operations of the pump is shown by Figs. 7, 9, 10 and 11. In Fig. 7, the plungers 128 and 129 are located in touching relation opposite the fuel inlet port 134. Turning cam 43 in the direction of the arrow 155 causes the plungers first to be separated, as shown in Fig. 9, causing fuel to be sucked into sleeve 130. Further turning of cam 43 causes plungers 128 and 129 to move equal distances to the respective positions shown in Fig. 10 which are opposite outlet port 137. Further turning of cam 43 causes plungers 128 and 129 to come together as shown in Fig. 11, thereby causing the fuel to be forced out through pipe 136. When a revolution of cam 43 has been completed the pump plungers will be returned to the respective positions shown in Fig. 7. The pump cam 43 is timed so that fuel will begin to be ejected through pipe 136 at the end of the compression stroke.

Figure 15:
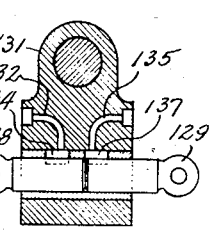

The speed of the engine is controlled by moving lever 154 so as to raise or lower the fulcrum studs 146 and 147. If studs 146 and 147 be moved to the upper-most position much less fuel will be pumped from the fuel tank and ejected into pipe 136. With the fulcrum studs in such a position, the operation will be as illustrated in Figs. 12, 13, 14 and 15 showing positions of the plungers corresponding to Figs. 7, 9, 10 and 11 respectively. It will be observed in Fig. 13 that the plungers are retracted to a lesser extent than in Fig. 9. Therefore, a smaller amount of fuel is sucked into the pump and ejected when the plungers come together again as shown in Fig. 15.

The fuel nozzle designated as a whole by numeral 160 will now be described. Nozzle 160 comprises casting 161 extending through the cylinder wall and provided with a passage 162 connected with pipe 136. Passage 162 leads into passage 163 arranged axially of cylinder 33; and in passage 163 is loosely journalled a shaft 164, provided at each end with a perforated disc 165.

Gears 42 and 46 mesh with gears 170 and 171, respectively, carried by shaft 172 which is rotatably mounted upon frame 30 and carries a driving pulley 173. Pulley 173 may be provided with a crank 174 for starting the engine.

The operation of the engine is as follows:
Air for combustion and scavenging purposes is drawn during the suction stroke, through ports 111 and 112 into the crank cases 31 and 32. During the operation of the engine, the fan 50 draws air in through passages 84 and blows it out through air intake pipe 90 and into annular passage 91 where it is initially compressed. This air enters the cylinder 33 at a time to be described later and is caused to swirl by reason of the tangential relation of pipe 90 to the passage 91. This swirling motion is indicated roughly by arrows 91a. This swirling air is moved toward nozzle 160 during the compression stroke and causes discs 165 to rotate.

At low speed valve ports 111, 112 are closed during the expansion stroke of the pistons and whatever air enters the cylinder after the expansion stroke is nearly finished and the cylinder intake opens, is due mainly to the pump actions of the pistons.

At high speed, however, these valves are constantly open because the fan blower attains sufficient speed to compress the air before it enters the cylinder. Therefore, at this high speed the blower furnishes a greater volume of air to the cylinder than that furnished merely by the displacement of the pistons. Hence, the partial vacuum which it creates due to sucking air through the crank cases faster than the pistons could pump it, would create a sufficient vacuum to keep the valve ports 111, 112 open constantly.

At the end of the compression stroke fuel is ejected through nozzle 160 and spreads out over the surfaces of the discs 165 and fills the perforations. The swirling air as it passes through the perforated discs picks up the fuel drops and causes them to be whirled around together with the fuel mist which is thrown off the edges of the rotating discs. In this manner an intimate mixture of fuel and combustion air is rapidly secured.

The fuel is preferably ignited by the heat of compression, although the well known forms of electrical ignition may be used at the start. The combustion space is preferably one-twelfth the displacement space so that the air will be raised to a temperature sufficient for fuel ignition purposes by compressing it within the cylinder.

During a portion of the combustion stroke the fuel continues to burn, and to develop power for driving the pistons. The fuel pump is operated so that the maximum amount of fuel injected is sufficient to consume substantially all of the combustion air when the engine operates at full load. The engine speed is decreased by adjusting the lever 154 so that less fuel will be injected.

Figure 18:
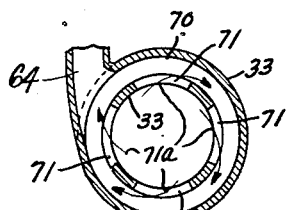
Fig. 18 is a sectional view taken on line 18—18 of Fig. 1.

As the pistons 34 and 35 are driven outwardly, from positions shown in Fig. 2 to positions shown in Fig. 3, this movement being indicated by arrows 34a and 35a, the exhaust ports 71 will be uncovered before the piston 35 uncovers ports 93. The swirling products of combustion will pass out ports 71 into passage 70 in the manner indicated by arrows 71a in Fig. 18. The exhaust will begin to expand as it passes through pipe 64 to the turbine chamber 54 and will attain a velocity sufficient to drive the turbine rotor 45. Some of the energy of the exhaust will be given up to the rotor to assist in driving the engine. The passing of the exhaust through the rotor and the dividing of it by ledge 56 into two streams which meet against the ledge 57 is effective in preventing the sudden rush of the exhaust into the atmosphere.

By the time piston 34 has moved to outer dead-center position (see Fig. 4), piston 35 will have completely uncovered ports 93 in valve 92, permitting the initially compressed air in the chamber 91 to rush in and blow out the dead air at the end of the cylinder where nearest piston 35.

As the rotation of shafts 38 and 41 continues in the direction of arrows 38a and 41a, respectively, the pistons 34 and 35 move in direction of arrows 34b and 35b, respectively. While exhaust ports 71 are being covered by the piston 34, valve 92 is being moved to open position by cams 47 and 48, so that by the time ports 71 are fully covered, valve 92 is in full open position as shown in Fig. 5. Before ports 71 are closed, fresh air, which has been initially compressed by the outward movement of the pistons or the centrifugal blower depending upon the speed of the motor, will swirl through the cylinder and completely drive out the exhaust. This fresh air by its whirling motion tends to maintain its own plane of rotation, and, therefore, the mixing of the fresh air with the dead air will be reduced to a minimum.

After ports 71 are closed, the slide valve 92 remains open, permitting additional fresh air to pile up whatever pressure the blower may generate.

In an ordinary two-cycle engine the intake port would have been opened sooner than in the present invention, thereby allowing less time for the pressure of the exhaust to drop low enough for fresh air to enter. In an ordinary two-cycle engine, the intake port would also have been closed before the exhaust port closed, thereby allowing less time for fresh air to enter to drive out the exhaust, than is the case of the present invention. Therefore the present invention is adapted to be operated at a much higher speed than the ordinary two-cycle engine.

A further advantage of the present invention over the ordinary two-cycle engine is that the pistons displace a volume of air in the crank cases equal to a very large percent of the total crank case and cylinder volume. The result is that the pistons themselves raise the pressure of the air higher than in the case of the ordinary two-cycle engine where the ratio of piston displacement to crank case volume is relatively small.

After piston 35 closes off communication between passage 91 and cylinder 33, valve 92 begins moving to closed position which it reaches by the time piston 35 has reached inner dead-center position.

When the pistons 34 and 35 have reached the inner dead-center positions shown in Fig. 2, fuel is again injected and burned, and the cycle of operations which has been described is repeated.

During the burning of the fuel the mixing of the burnt air with fresh air is reduced to a minimum in the present invention. The fresh air is caused to whirl as it enters the cylinder by means hereinbefore described. As this air is compressed it is still whirling and the fuel nozzle discs 165 take up this motion. By the time the pistons reach the inner dead-center the air is still whirling though retarded by the fuel nozzle stem and by friction of the air itself. However, the discs 165 have stored some energy during the first part of the compression stroke and give up this energy to the air during the latter part of the compression stroke tending to maintain the whirling motion. With the pistons located at inner dead-center, most of the compressed air is confined between the discs 165. As the pistons 34 and 35 separate, the air expands through and around the discs carrying the fuel oil with it, which burns as it is ejected from the nozzle and mixes with the air. The air supporting combustion has still enough whirling motion to maintain itself in its own plane of rotation, and, therefore, the burnt air does not tend to mix with the fresh air which is pushing outwardly from the center point of the cylinder toward the outer ends thereof.

Vibration is substantially eliminated by providing in the one cylinder, two pistons of equal weight which drive two crank shafts in opposite directions through connecting rods and cranks of equal weight; and by providing that the two shafts together with the respective parts rotating therewith shall develop equal kinetic energies. Since there is only one slide valve, the oscillating counterbalances 101 and 102 are provided.

By eliminating vibration, the extent of use of the engine is greatly increased. It can be operated without a heavy foundation and therefore may be readily transported while in operation. It can, therefore, be constructed as a portable power device for all sorts of purposes, including domestic use and use as the prime mover of a portable hand tool such as a drill, saw or planer.

The portability of the engine is further increased by the use of small flywheels which are geared up to the crank shafts so as to develop the same energy of rotation as the conventional large flywheel directly connected to the crank shaft.

The gearing up of the flywheels is taken advantage of by constructing the flywheels so that one may act as a high-speed fan rotor, and the other may serve as a turbine rotor converting some of the energy of the exhaust into useful power, and, at the same time, serving as one element of an exhaust muffler.

It is to be understood that the invention is not restricted to the particular impulse turbine disclosed, but that other types such as the conventional DeLaval type may be used. In such a case the exhaust would enter on one side of the turbine rotor and leave on the opposite side, and would then pass into muffler passages in the turbine case and then out into the atmosphere.

It is to be understood that some form of cooling system is used for cooling the cylinder and fuel nozzle. For sake of clearness, the cooling system has been omitted from the drawings.

While the form of mechanism herein shown and described constitutes a preferred form of embodiment of the invention, it is to be understood that other forms might be adopted, all coming within the scope of the claims which follow.

This specification is a substitute for my original specification Serial No. 344,715, filed December 13, 1919.

What I claim is as follows:

1. In an internal combustion engine, the combination with a cylinder and a piston reciprocating therein, said cylinder having inlet and outlet ports; of means for initially compressing the combustion air; means for causing the air to take up a whirling motion as it enters the cylinder; means for maintaining a rotation of the air; means for injecting fuel; and means permitting the exhaust to leave the cylinder by a similar whirling motion.

2. In an internal combustion engine, the combination with a cylinder and a piston reciprocating therein, said cylinder having an inlet port adjacent one end and an outlet port adjacent the other end; of means for initially compressing the combustion air; means for causing the air to take up a whirling motion as it enters the cylinder; means for maintaining a rotation of the air; means for injecting fuel; and means permitting the exhaust to leave the cylinder by a similar whirling motion.

3. In an internal combustion engine, the combination with a cylinder and a piston reciprocating therein, said cylinder having inlet and outlet ports; of means for initially compressing the combustion air; means for causing the air to take up a whirling motion as it enters the cylinder; means for injecting fuel; and means for maintaining a rotation of the air and for spraying the fuel.

4. In an internal combustion engine, the combination with a cylinder and a piston reciprocating therein, said cylinder having an inlet port adjacent one end and an outlet port adjacent the other end; of means for initially compressing the combustion air; means for causing the air to take up a whirling motion as it enters the cylinder; means for injecting fuel; and means for maintaining a rotation of the air and for spraying the fuel.

5. In an internal combustion engine, the combination with a cylinder and a piston reciprocating therein, said cylinder having inlet and outlet ports; of means for initially compressing the combustion air; means for causing the air to take up a whirling motion as it enters the cylinder; means for injecting fuel; and rotating means for taking up the whirling motion of the incoming air, and later for imparting motion to the air.

6. In an internal combustion engine, the combination with a cylinder and a piston reciprocating therein, said cylinder having an inlet port adjacent one end and an outlet port adjacent the other end; of means for initially compressing the combustion air; means for causing the air to take up a whirling motion as it enters the cylinder; means for injecting fuel; and rotating means for taking up the whirling motion of the incoming air, and later, for imparting motion to the air.

7. In an internal combustion engine, the combination with a cylinder and a pair of pistons reciprocating oppositely therein, said cylinder having air inlet and exhaust ports; of means for initially compressing the combustion air; means for causing the air to take up a whirling motion as it enters the cylinder; means for injecting fuel; and means located in the clearance space between the pistons for maintaining a rotation of the air.

8. In an internal combustion engine, the combination with a cylinder and a pair of pistons reciprocating oppositely therein, said cylinder having an air inlet port located adjacent one end, and an exhaust port located adjacent the other end thereof; of means for initially compressing the combustion air; means for causing the air to take up a whirling motion as it enters the cylinder; means for injecting fuel; and means located in the clearance space between the pistons for maintaining a rotation of the air.

9. In an internal combustion engine, the combination with a cylinder and a pair of pistons reciprocating oppositely therein, said cylinder having an air inlet port located adjacent one end, and an exhaust port located adjacent the other end thereof; of means for initially compressing the combustion air; means for causing the air to take up a whirling motion as it enters the cylinder; means for injecting fuel; and rotatable means located in the clearance space between the pistons for taking up the whirling motion of the incoming air, and later, for imparting motion to the air.

10. In an internal combustion engine, the combination with a cylinder and a pair of pistons reciprocating oppositely therein, said cylinder having an air inlet port located adjacent one end and an exhaust port located adjacent the other end thereof; of means for initially compressing the combustion air; means for causing the air to take up a whirling motion as it enters the cylinder; means for injecting fuel; and rotatable means located in the clearance space between the pistons for taking up the whirling motion of the incoming air, and later, for imparting motion to said air, said rotatable means operating to mix the fuel and whirling air.

11. In an internal combustion engine, the combination with a cylinder and a pair of pistons reciprocating oppositely therein, said cylinder having an air inlet port located adjacent one end and an exhaust port located adjacent the other end thereof; of means for initially compressing the combustion air; means for causing the air to take up a whirling motion as it enters the cylinder; means for injecting fuel; and rotating discs supported by the cylinder between the pistons for taking up the whirling motion of the incoming air, and later, for imparting motion to said air, said rotating discs operating to mix the fuel and whirling air.

12. In an internal combustion engine, the combination with a cylinder and a pair of pistons reciprocating oppositely therein, said cylinder having an air inlet port located adjacent one end and an exhaust port located adjacent the other end thereof; of means for initially compressing the combustion air; means for causing the air to take up a whirling motion as it enters the cylinder; means for injecting fuel; and rotating discs mounted upon a shaft, loosely journalled within a member supported by the cylinder, said member having a fuel passage leading to said shaft and connected with the fuel injecting means.

13. In an internal combustion engine, the combination with a cylinder and a pair of pistons reciprocating oppositely therein, said cylinder having an air inlet port located adjacent one end and an exhaust port located adjacent the other end thereof; of means for initially compressing the combustion air; means for causing the air to take up a whirling motion as it enters the cylinder; means for injecting fuel; and perforated rotating discs mounted upon a shaft, loosely journalled within a member supported by the cylinder, said member having a fuel passage leading to said shaft and connected with the fuel injecting means.

14. In an internal combustion engine, the combination with a cylinder and a pair of pistons reciprocating oppositely therein, said cylinder having an air inlet port located adjacent one end and an exhaust port located adjacent the other end thereof; of means for initially compressing the combustion air; means for causing the air to take up a whirling motion as it enters the cylinder; means for injecting fuel; and perforated rotating discs mounted at each end of a shaft loosely journalled within a member supported by the cylinder, said member having a fuel passage leading to said shaft and connected with the fuel injecting means.

15. In an internal combustion engine, the combination of a cylinder and a pair of pistons reciprocating oppositely therein, said cylinder having an air inlet port located adjacent one end, and an exhaust port located adjacent the other end thereof, one of said pistons controlling the opening of the exhaust port; and an engine operated sleeve valve in which the other piston slides for controlling the opening of the air intake port.

16. In an internal combustion engine, the combination of a cylinder and a pair of pistons reciprocating oppositely therein, said cylinder having an air inlet port located adjacent one end, and an exhaust port located adjacent the other end thereof, one of said pistons controlling the opening of the exhaust port; and an engine operated sleeve valve in which the other piston slides for controlling the opening of the air intake port; said sleeve valve having auxiliary intake ports controlled by the movements of said sleeve valve and said other piston.

17. In an internal combustion engine, the combination of a cylinder and a pair of pistons reciprocating oppositely therein, said cylinder having an air inlet port located adjacent one end, and an exhaust port located adjacent the other end thereof, one of said pistons controlling the opening of the exhaust port; and an engine operated sleeve valve in which the other piston slides for controlling the opening of the air intake port; said sleeve valve having auxiliary intake ports, the opening of which is controlled by the movement of said other piston, and the closing of which is controlled by the movements of both the sleeve valve and said other piston.

18. In an internal combustion engine, the combination of a cylinder and a pair of pistons reciprocating oppositely therein, said cylinder having a main air inlet port located adjacent one end, and an exhaust port located adjacent the other end thereof, one of said pistons controlling the opening of the exhaust port; and engine operated means for controlling the opening of the main air intake port, said means having an auxiliary air intake port controlled by the other piston.

19. In an internal combustion engine, the combination of a cylinder and a pair of pistons reciprocating oppositely therein, said cylinder having a main air inlet port located adjacent one end, and an exhaust port located adjacent the other end thereof, one of said pistons controlling the opening of the exhaust port; and engine-operated sleeve valve for controlling the opening of the main air intake port, said valve having an auxiliary air intake port controlled by the other piston.

20. In an internal combustion engine, the combination of a cylinder and a pair of pistons reciprocating oppositely therein, said cylinder having a main air inlet port located adjacent one end, and an exhaust port located adjacent the other end thereof; and engine operated sleeve valve for controlling the opening of the main air intake port, said valve having an auxiliary air intake port; and mechanical connections between the pistons and sleeve valve whereby the exhaust port is first opened, then the auxiliary air port is opened while the exhaust is still opened, then the auxiliary air valve closes before the exhaust port is closed, then while the exhaust port is being closed the main air port is being opened, and then the main air port is closed after the exhaust port has been closed.

21. In an internal combustion engine, the combination of a cylinder and a pair of pistons reciprocating oppositely therein, said cylinder having a main air inlet port located adjacent one end, and an exhaust port located adjacent the other end thereof; an engine operated sleeve valve for controlling the opening of the main air intake port, said valve having an auxiliary air intake port; and mechanical connections between the pistons and sleeve valve whereby first the exhaust port is opened while the pistons advance toward outer dead center, whereby the auxiliary port is next opened, but before the pistons reach outer dead center, whereby the exhaust and auxiliary port are fully opened at outer dead center, whereby, upon the movement of the pistons toward inner dead center, the auxiliary port is closed first while the exhaust port is being closed and the main air port is being opened, and whereby the main air port is closed after the exhaust port is closed.

22. In an internal combustion engine, the combination of a cylinder and a pair of pistons reciprocating oppositely therein, said cylinder having a main air inlet port located adjacent one end, and an exhaust port located adjacent the other end thereof; and engine operated sleeve valve for controlling the opening of the main air intake port, said valve having an auxiliary air intake port; and mechanical connections between the pistons and sleeve valve whereby the exhaust port opens before the auxiliary air port opens and closes after the auxiliary air port closes, but closes before the main air port closes.

23. In an internal combustion engine, the combination of a cylinder and a pair of pistons reciprocating oppositely therein, said cylinder having a main air inlet port located adjacent one end, and an exhaust port located adjacent the other end thereof; and engine operated sleeve valve for controlling the opening of the main air intake port, said valve having an auxiliary air intake port; and mechanical connections between the pistons and sleeve valve whereby the exhaust port opens before the auxiliary air port opens and closes after the auxiliary air port closes, whereby the main air port begins to open as the auxiliary air port is being closed, and begins to close after the exhaust port is closed.

24. In an internal combustion engine, the combination of a cylinder and a pair of pistons reciprocating oppositely therein, said cylinder having an air inlet port located adjacent one end, and an exhaust port located adjacent the other end thereof; and mechanical connections between the pistons whereby the exhaust port is first opened but closes after the air port begins to open, and whereby the air port begins to close after the exhaust port is fully closed.

25. In an internal combustion engine, the combination of a cylinder and a pair of pistons reciprocating oppositely therein, said cylinder having an air inlet port located adjacent one end, and an exhaust port located adjacent the other end thereof; and mechanical connections between the pistons whereby the exhaust port is first opened, whereby just after the exhaust port is fully opened the air port begins to open but does not begin to close until after the exhaust port is fully closed.

26. The method of burning fuel in an internal combustion engine cylinder consisting in causing the combustion air to rotate as it passes through the cylinder, in compressing the air while maintaining the air in a state of rotation, in injecting fuel when the air is fully compressed, in causing the fuel to burn as the air expands whereby the burnt air by virtue of its rotating motion tends to maintain its plane of rotation and the tendency for the burnt air to mix with the fresh air is reduced to a minimum.

27. The method of burning fuel in an internal combustion engine cylinder consisting in causing the combustion air to rotate as it passes through the cylinder, in compressing the air while maintaining the air in a state of rotation, in injecting fuel, in causing the fuel to burn as the air expands whereby the burnt air by virtue of its rotating motion tends to maintain its plane of rotation and the tendency for the burnt air to mix with the fresh air is reduced to a minimum.

28. In a two-cycle engine the combination of a cylinder and a piston reciprocating therein, said cylinder having inlet and exhaust ports; and means for compressing the unburnt air in the cylinder prior to the compression stroke of the piston.

29. In an internal combustion engine the combination of a cylinder and a piston reciprocating therein, said cylinder having inlet and exhaust ports and means whereby the unburnt air entering the cylinder is compressed therein after the exhaust port closes but before the inlet port closes and prior to the compression stroke of the piston.

30. In an internal combustion engine the combination of a cylinder and a piston reciprocating therein, said cylinder having inlet and exhaust ports and engine driven means whereby the unburnt air entering the cylinder is compressed therein after the exhaust port closes but before the inlet port closes and prior to the compression stroke of the piston.

31. In a two-cycle engine the combination of a cylinder and a pair of pistons reciprocating oppositely therein, said cylinder having inlet and exhaust ports and engine driven means intermediate one of said pistons and cylinder and cooperating with said inlet port whereby the inlet port is opened after the exhaust port opens and is closed after the exhaust port closes.

32. In a two-cycle engine the combination of a cylinder and a pair of pistons reciprocating oppositely therein, said cylinder having inlet and exhaust ports and means for compressing the unburnt air in the cylinder prior to the compression stroke of the piston.

33. In a two-cycle engine the combination of a cylinder and a piston reciprocating therein, said cylinder having inlet and exhaust ports; and centrifugal means and mechanical connections between said ports and said centrifugal means whereby the unburnt air entering the cylinder is compressed after the exhaust port closes but before the inlet port closes and prior to the compression stroke of the piston.

34. In an internal combustion engine, the combination with a cylinder having an air intake passage; of a centrifugal air compressor connected with the intake; a piston; a shaft; mechanical connections between the piston and shaft for rotating the same; and high speed gearing between the shaft and said compressor.

35. In an internal combustion engine, the combination with a cylinder having an air intake passage; of a centrifugal air compressor connected with the intake; means for rotating said centrifugal air compressor at a relatively high speed; a piston; a shaft; and mechanical connections between the piston and shaft for rotating the same.

In testimony whereof I affix my signature.

WILLIAM H. ROBERTSON.